United States Patent Office 3,442,670
Patented May 6, 1969

3,442,670
CARBON COMPOSITION AND PROCESS
Joseph R. Parsons, Park Forest, Ill., assignor to Chicago Fire Brick Company, Chicago, Ill., a corporation of Illinois
No Drawing. Filed Feb. 14, 1967, Ser. No. 615,890
Int. Cl. C04b 35/52, 25/02; B22b 1/22
U.S. Cl. 106—56
5 Claims

ABSTRACT OF THE DISCLOSURE

Particles of carbon mixed with bonding amounts of pitch, and hydraulic cement. This composition is mixed with water and poured or vibrated into a mold. The carbon-concrete is allowed to set and the shaped product is dried. The final carbon bonding takes place by carbonization of the pitch when the product is used as a refractory under service condition.

Background of invention

The invention relates to carbon compositions, suitable for making carbon blocks and other shapes for refractory use; and to a method of making such shaped articles.

The usual method of manufacture of carbon blocks is to use hot pitch as a binder and blend it with suitable graded calcined coke. The ratio is usually 20 to 30% pitch and the remainder graded coke. The blending usually takes place in a steam heated mixer. The large shapes are formed by tamping into suitable molds or large presses. The blocks are allowed to cool slowly, usually six to ten days, to develop strength. The shapes are then slowly fired in muffle furnaces completely covered in calcined coke to prevent oxidation. The firing ranges from 2500° F. to 2650° F. and the usual time takes from 20 to 30 days.

Pitch has a sharp melting point and goes to a complete fluid before carbonization. For this reason slow heating is essential so carbonization travels slowly through the shape, preventing it from slumping. The above practice discloses a slow and tedious process which converts carbon grain into useful shapes and blocks.

The normal method of manufacturing a refractory castable is to properly grain size a suitable refractory aggregate such as fire brick bats, calcined flint clay, dead burned bauxite or other hard fired alumina oxides. Depending on the grade of castable described the selected aggregate is mixed with 10 to 30% calcium silicate or calcium aluminate cement. The aggregate and cement are mixed with water and cast into molds to form refractory concrete shapes. After drying, the refractory concretes are put into service. When the refractory concrete is heated up the calcium silicate or aluminate dehydrates causing a zone of weakness to develop in the refractory. This usually develops between 1200° F. and 2000° F. depending on the type of castable.

After these temperatures a ceramic or glassy bond develops between the cement and the aggregate. The development of refractory concrete is therefore a two-stage process.

The great value of carbon is its non-wetting properties making it useful to hold slags and molten metals. It is this non-wetting property which prevents the development of a normal ceramic glassy bond. Although this glass forms it will not bond to the carbon particles. Carbons seem to be wet readily by carbon compounds such as pitch, sea coals, asphalts and resins.

An object of this invention is to provide a carbon castable composition suitable for producing carbon block and other shaped articles for refractory use in a simple and direct manner.

Summary

In accordance with this invention a carbon castable composition is made by mixing together particles of carbon with bonding amounts of particles of an adhesive carbon compound such as pitch, sea coals, asphalts and resins; and bonding amounts of hydraulic cement.

The carbon may be in the form of graphite, calcined hard coal, calcined petroleum coke or mixtures thereof.

The carbon is suitably present in about 50% to 90% by weight of the composition.

One of the objects of this invention is to take full advantage of the dense coarse grains of carbon available for use. I have found no matrix or bonding medium equal in slag or metal resistance to that found in coarse hard fired carbons and graphite. Coarse grained specialties are easy to work as castables but cannot be used as gun mixes and are very difficult as plastics. Under service conditions these large lumps stand out as the main resistance to abrasion and wears against molten slags or metals.

I have found that graphite and coke grains bond quite differently from one another. Least suitable are the uncalcined petroleum cokes which develop shrinkage cracks on firing, and bond together poorly. Graphite, while more suitable seems to surface bond only. Hard calcined coals also develop only surface bonding. Calcined petroleum cokes appears to have a natural porosity which improves the bond of the matrix. Small percentages of pulverized petroleum coke are included to improve the bond. Therefore the preferred composition contains calcined petroleum cokes of coarse and fine particle size usually with graphite or calcined hard coal, but as above stated all types and varieties of carbon particles can be used.

The size of the carbon particles may vary widely. It is preferable to use some coarse and some fine particles. Coarse particle of 2" diameter and even larger may be used with fines of —60 mesh and finer.

The preferred carbon compound bonding agent is pitch which may be pulverized, pellitized or flake. It may suitably be present in 5–25% by weight of the composition. Pitch starts to convert to carbon about 800° F. and continues through 1500° F., the carbon to carbon bond formed by such heating increasing in strength as the pitch carbonizes. The test data given in this case was obtained at 1000° F.

All hydraulic cements are suitable, including Portland and aluminous cement. Small amounts of hydraulic cement such as 5 to 22% are capable of holding the carbon particles in place when the castable composition of this invention are made into carbon blocks and used in a furnace.

This small amount of cement allows direct manufacture of carbon shapes such as blocks without the necessity of going through the long prior art process described above.

To produce a carbon shape with the composition of this invention the mixture consisting of carbon particles, carbon compound binder, and cement binder is mixed with suffifficient water to reduce to a stiff consistency. About 15–20% water with graphites and coal and up to about 30% water with petroleum cokes gives satisfactory consistency. This composition is poured or vibrated into a suitable mold. Vibrating the concrete into place is preferred since this develops better dry strength. The carbon concrete is allowed to set, suitably for 12 hours, and the molds removed. The shape is dried to remove all free moisture. The whole process takes about 48 hours or less, as compared to 20–30 days for prior art processes using prior art carbon mixes.

The carbon block or other shape made as above described may be crated and shipped. As thus made it is held together by the cement forming a carbon concrete. However in use of the block in a furnace under service conditions the final bond takes place by carbonization of the pitch.

*Specific embodiments*

The following are specific examples of carbon castable compositions suitable for forming carbon concrete shaped refractory products, which develop a carbon bond during furnace service conditions.

EXAMPLES OF 80% CARBON CASTABLES USING CA 25 CEMENT

| Materials | 1 | 2 | 3 |
|---|---|---|---|
| Graphite ¼" and 20 mesh | 50 | | |
| Calcined hard coal ¼" and fines | | 50 | |
| Calcined petroleum coke ¼" and fines | | | 50 |
| Calcined petroleum coke 60 mesh | 15 | 15 | 15 |
| Blast furnace pitch | 15 | 15 | 15 |
| Alcoa CA 25 cement [1] | 20 | 20 | 20 |
| Physical properties after firing to 1,000° F.: | | | |
| Bulk density | 83.8 | 87.4 | 74.3 |
| Modulus of rupture | 731 | 410 | 398 |
| Shrinkage | 0.00 | −0.26 | 0.10 |

[1] A hydraulic cement containing approximately 80% $Al_2O_3$ and 20% CaO.

EXAMPLES OF 80% CARBON CASTABLES USING LUMNITE CEMENT

| Materials | 4 | 5 | 6 |
|---|---|---|---|
| Graphite ¼" on 20 mesh | 50 | | |
| Calcined hard coal ¼" and fines | | 50 | |
| Calcined petroleum coke ¼" and fines | | | 40 |
| Calcined petroleum coke 60 mesh | 15 | 15 | 25 |
| Blast furnace pitch | 15 | 15 | 15 |
| Lumnite cement | 20 | 20 | 20 |
| Physical properties after firing to 1,000° F.: | | | |
| Bulk density, lbs/cu. ft. | 86 | 80.5 | 74.8 |
| Cold crushing strength | | 1,2 0 | 1,105 |
| Modulus of rupture | 456 | 715 | 556 |
| Shrinkage | −0.37 | −0.11 | −0.18 |

EXAMPLES OF 90% CARBON CASTABLES USING HIGH EARLY PORTLAND CEMENT

| Materials | 7 | 8 | 9 |
|---|---|---|---|
| Graphite ¼ on 20 mesh | 60 | | |
| Calcined hard coal ¼ and fines | | 60 | |
| Calcined petroleum coke ¼" and fines | | | 50 |
| Calcined petroleum coke 60 mesh | 15 | 15 | 25 |
| Blast furnace pitch | 15 | 15 | 15 |
| High early Portland cement | 10 | 10 | 10 |
| Physical Properties after Firing to 1,000° F.: | | | |
| Bulk density, lbs/cu. ft. | 85 | 76 | 69.6 |
| Cold crushing strength | 461 | 883 | 545 |
| Modulus of rupture | 246 | 445 | 304 |
| Shrinkage | +0.07 | −0.33 | −0.22 |

EXAMPLES OF 90% COARSE GRAINED CARBON CASTABLES

| Materials | 10 | 11 | 12 |
|---|---|---|---|
| Coarse graphite 1¼" on ¾" | 50 | | |
| Coarse calcined coal 1" on ½" | | 50 | |
| Graphite ¼ on 20 mesh | 10 | 10 | 60 |
| Calcined coke 60 mesh | 15 | 15 | 20 |
| Pulverized coal tar pitch | 15 | 15 | |
| Flake coal tar pitch | | | 15 |
| High early cement | 10 | 10 | 5 |
| Physical properties after 1,000° F. fire: | | | |
| Bulk density, lbs/cu. ft. | 86.5 | 80.0 | 70.0 |
| Cold crushing strength | 350 | 442 | 106 |
| Modulus of rupture | 212 | 234 | 92 |
| Shrinkage | −0.18 | −0.55 | 0.33 |

The following is a typical screen analysis as exemplified by the screen analysis on Formulae 4 and 10.

SCREEN ANALYSIS OF CARBON CASTABLES

| Tyler screen size | Formula No. 4 (regular) | Formula No. 10 (coarse) |
|---|---|---|
| 1⅜ on ¾ | | 23.6 |
| ¾ on ¼ | | 23.6 |
| ¼ on 4 mesh | 25.8 | 8.6 |
| −4 on 8 mesh | 6.6 | 1.5 |
| −8 on 10 mesh | 18.1 | .9 |
| −10 on 14 mesh | 11.1 | 3.2 |
| −14 on 20 mesh | 1.2 | 1.0 |
| −20 on 28 mesh | .2 | .5 |
| −28 on 35 mesh | 2.6 | .9 |
| −35 on 65 mesh | 1.5 | 6.3 |
| −65 on 100 mesh | 3.9 | 9.0 |
| −100 mesh | 27.6 | 21.0 |

I claim:
1. A composition suitable for making shaped refractory articles consisting essentially of particles of carbon present in from 50–90 percent by weight and bonding amounts of an adhesive carbon compound selected from the group consisting of pitch, sea coals, asphalt, and resins and a hydraulic cement, the adhesive carbon compound being present in from 5–25 percent by weight and the remainder being the hydraulic cement present in at least 5 percent by weight.

2. The composition of claim 1 wherein the carbon compound is pitch.

3. The composition of claim 2 wherein the carbon particles are present in 50–90% by weight, the pitch from 5 to 25% by weight and the cement from 5 to 25% by weight.

4. The composition of claim 3 wherein the particles of carbon include calcined petroleum coke.

5. A refractory shaped article consisting essentially of a carbon concrete consisting of from 50–90 percent by weight of particles of carbon bonded together by a mixture of hydraulic cement in an adhesive carbon compound selected from the group consisting of pitch, sea coals, asphalt, and resins, the adhesive carbon compound being present in from 5–25 percent by weight of the composition and the remainder of the composition being the hydraulic cement present in at least 5 percent by weight.

References Cited

UNITED STATES PATENTS

| | | | |
|---|---|---|---|
| 991,419 | 5/1911 | Brand | 106—97 |
| 1,020,325 | 3/1912 | Stinebaugh | 106—97 |
| 3,252,813 | 5/1966 | Cremer et al. | 106—56 |
| 3,376,146 | 4/1968 | Mitchell | 106—97 |

JAMES E. POER, *Primary Examiner.*

U.S. Cl. X.R.

106—64, 94, 96, 97